(12) United States Patent
Bresnahan et al.

(10) Patent No.: US 11,238,145 B2
(45) Date of Patent: Feb. 1, 2022

(54) PORTABLE BIOMETRIC CAPTURE SYSTEM

(71) Applicant: Idemia Identity & Security USA LLC, Billerica, MA (US)

(72) Inventors: Brian Bresnahan, Waltham, MA (US); Patrice Erickson, Eden Prairie, MN (US); Anne Gray, North Andover, MA (US); Robert Grosso, Merrimack, NH (US); Angelo Sallese, Stow, MA (US); Harshad Thacore, Bedford, MA (US); Derek Riemer, Westford, MA (US); Amy Potts, Westford, MA (US); Nick Casco, Bolton, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 238 days.

(21) Appl. No.: 16/552,125

(22) Filed: Aug. 27, 2019

(65) Prior Publication Data

US 2021/0064727 A1    Mar. 4, 2021

(51) Int. Cl.
*G06K 9/00* (2006.01)
*G06F 21/32* (2013.01)
(Continued)

(52) U.S. Cl.
CPC .......... *G06F 21/32* (2013.01); *G06F 3/03547* (2013.01); *G06K 9/00006* (2013.01);
(Continued)

(58) Field of Classification Search
CPC ... G06F 21/32; G06F 3/03547; H04N 5/2257; H04N 5/2252; H04N 5/2251;
(Continued)

(56) References Cited

U.S. PATENT DOCUMENTS

| 4,248,510 A | * | 2/1981 | Baker | G03B 17/24 |
| | | | | 396/332 |
| 4,474,439 A | * | 10/1984 | Brown | F16M 11/08 |
| | | | | 352/243 |

(Continued)

FOREIGN PATENT DOCUMENTS

CA    2320916 A1 * 8/1999 ........... H02G 11/006

OTHER PUBLICATIONS

Notice of Allowance in U.S. Appl. No. 29/703,421, dated Aug. 10, 2020, 9 pages.

*Primary Examiner* — Mahendra R Patel

(74) *Attorney, Agent, or Firm* — Fish & Richardson P.C.

(57) ABSTRACT

Innovative aspects of the subject matter described in this specification can be embodied in a portable biometric capture system. In one example, a portable biometric capture system includes a case, a telescoping stand, a camera housing, and a power source. The case includes wheels and a carry handle. The telescoping stand has a first end and a second end. The first end of the telescoping stand is coupled to a surface within an interior of the case by a first pivotable joint. The camera housing is coupled to the second end of the telescoping stand by a second pivotable joint. The power source is installed within the interior of the case and electrically connected to a wiring that is routed to the camera housing through a channel within the telescoping stand.

20 Claims, 7 Drawing Sheets

(51) Int. Cl.
  *H04N 5/225*     (2006.01)
  *G06F 3/0354*    (2013.01)
  *G03B 17/04*     (2021.01)
(52) U.S. Cl.
  CPC ......... *H04N 5/2252* (2013.01); *H04N 5/2257* (2013.01); *G03B 17/04* (2013.01)
(58) Field of Classification Search
  CPC .... G06K 9/00006; G03B 17/04; F16M 11/28; F16M 11/42; F16M 11/24; F16M 11/2014; F16M 2200/08
  USPC ....................................................... 382/115
  See application file for complete search history.

(56) References Cited

U.S. PATENT DOCUMENTS

| | | | |
|---|---|---|---|
| 6,484,456 B1 * | 11/2002 | Featherstone | H01Q 1/08 362/249.09 |
| 6,709,172 B2 * | 3/2004 | Brown | G08B 13/19623 348/143 |
| D501,494 S | 2/2005 | Ogura | |
| 7,646,425 B2 * | 1/2010 | Bohaker | H04N 1/00562 348/373 |
| D616,901 S | 6/2010 | Ward et al. | |
| D736,845 S | 8/2015 | Yilin | |
| D809,045 S | 1/2018 | Jou et al. | |
| D819,715 S | 6/2018 | Lamans et al. | |
| D820,894 S | 6/2018 | Tang et al. | |
| D840,851 S | 2/2019 | Ammar et al. | |
| D849,077 S | 5/2019 | Tian | |
| D859,498 S | 9/2019 | Lin | |
| D863,404 S | 10/2019 | Kapenko et al. | |
| D876,519 S | 2/2020 | Yannay | |
| D888,130 S | 6/2020 | Kintner | |
| 2005/0243199 A1 * | 11/2005 | Bohaker | H04N 1/00559 348/373 |
| 2006/0213996 A1 * | 9/2006 | Crucs | A61B 6/545 235/462.13 |
| 2008/0226284 A1 * | 9/2008 | Coppola | G03B 17/561 396/428 |
| 2009/0310329 A1 * | 12/2009 | Brown | G03B 15/02 362/18 |
| 2012/0181979 A1 * | 7/2012 | Hudspeth | F16M 11/245 320/108 |
| 2015/0152998 A1 * | 6/2015 | Intravatola | F21V 17/007 248/528 |
| 2015/0330558 A1 * | 11/2015 | Intravatola | F16M 11/28 362/184 |

* cited by examiner

PORTABLE BIOMETRIC CAPTURE SYSTEM

TECHNICAL FIELD

This disclosure generally relates to protective cases, and more particularly to a portable biometric capture system integrated into a protective case.

BACKGROUND

Biometric information is often captured by identification-issuing authorities. For instance, biometric information such as photographs (i.e. photo images) and fingerprints are often captured by identification issuing authorities to create identification credentials (e.g., ID cards) for individuals. In some instances, it is desirable to have a portable systems that allows employees of an identification issuing authority to capture biometric information of identification enrollees at remote locations.

SUMMARY

In general, innovative aspects of the subject matter described in this specification can be embodied in a portable biometric capture system that includes a case, a telescoping stand, a camera housing, and a power source. The case includes wheels and a carry handle. The telescoping stand has a first end and a second end. The first end of the telescoping stand is coupled to a surface within an interior of the case by a first pivotable joint. The camera housing is coupled to the second end of the telescoping stand by a second pivotable joint. The power source is installed within the interior of the case and electrically connected to a wiring that is routed to the camera housing through a channel within the telescoping stand.

Another general aspect can be embodied in a portable biometric capture system that includes a case, a telescoping stand, a camera housing, an electronic touch pad, a power source, and a data communication interface. The case includes wheels and a carry handle. The telescoping stand has a first end and a second end. The first end of the telescoping stand is coupled to a surface within an interior of the case by a first pivotable joint. The camera housing is coupled to the second end of the telescoping stand by a second pivotable joint. The camera housing includes a bracket configured to receive a camera and a flash, and an outer shell configured to enclose the camera and the flash, with the camera mounted in the bracket. The outer shell has an opening positioned to align with a lens of the camera, with the camera mounted in the bracket. The outer shell includes a first and second window. The first window is positioned to align with a light-emitting element of the flash, with the flash mounted in the bracket. The second window is positioned to align with a light meter of the flash, with the flash mounted in the bracket. The electronic touch pad is installed within the interior of the case. The power source is installed within the interior of the case and electrically connected to the electronic touch pad and to a wiring routed to the camera housing through a channel within the telescoping stand. The data communication interface is installed within the interior of the case, and the data communication interface is electrically connected to the electronic touch pad and the wiring.

These and other implementations can each optionally include one or more of the following features. In some implementations, the first pivotable joint is a first hinge joint arranged to permit the telescoping stand to pivot in a first direction relative to case, and the second joint is a hinge joint arranged to permit the camera housing to pivot in a second direction relative to the case, the second direction being different from the first direction. In some implementations, the first pivotable joint is arranged to pivot about a first axis that is substantially parallel to a width of the case, and wherein the second pivotable joint is arranged to pivot about a second axis that is substantially parallel to a depth of the case.

In some implementations, the camera housing includes an access door. In some implementations, the camera housing is configured to retain a camera and a flash with the camera oriented in a portrait orientation and with a light-emitting element of the flash positioned above and proximate to a lens of the camera, when the telescoping stand is in an upright position. In some implementations, the camera housing includes a first window positioned to substantially align with the light-emitting element of the flash, and a second window positioned to substantially align with a light sensor of the flash.

In some implementations, the case is made of metal or metal alloys, aluminum, carbon fiber, fiberglass, steel, plastic, or other composite materials. In some implementations, the telescoping stand is made of metal or metal alloys, aluminum, carbon fiber, fiberglass, steel, plastic, or other composite materials. In some implementations, the outer shell of the camera housing is made of metal or metal alloys, aluminum, carbon fiber, fiberglass, steel, plastic, or other composite materials.

In some implementations, the system includes a data communication interface installed within the interior of the case, where the data communication interface is electrically connected to the wiring. In some implementations, the data communication interface includes a Universal Serial Bus (USB) hub. In some implementations, the data communication interface includes a wireless network interface.

In some implementations, the camera bracket is configured to retain the camera in a portrait orientation and to retain the flash oriented with the light-emitting element of the flash positioned above and proximate to the lens of the camera, when the telescoping stand is in an upright position. In some implementations, the outer shell is shaped to conform with an outline of the camera in the portrait orientation with the flash positioned above the camera lens. In some implementations, the electronic touch pad comprises a fingerprint reader.

Another general aspect can be embodied in a portable biometric capture system that includes a case, a telescoping stand, a camera housing, an electronic touch pad, a power source, and a data communication interface. The case includes wheels and a carry handle. The telescoping stand has a first end and a second end. The first end of the telescoping stand is coupled to a surface within an interior of the case by a first pivotable joint. The camera housing is coupled to the second end of the telescoping stand by a second pivotable joint. The camera housing includes a bracket, a camera mounted in the bracket, a flash mounted in the bracket adjacent to the camera, and an outer shell configured to enclose the camera and the flash. The outer shell has an opening positioned to align with a lens of the camera. The outer shell includes a first window and a second window. The first window is positioned to align with a light-emitting element of the flash, and the a second window is positioned to align with a light meter of the flash. The electronic touch pad is installed within the interior of the case. The power source is installed within the interior of the case and electrically connected to the electronic touch pad and to a wiring routed to the camera housing through a channel within the telescoping stand. The data communication interface is installed within the interior of the case, and the data communication interface is electrically connected to the electronic touch pad and the wiring.

In some implementations, the camera is a digital single-lens camera (DSLR). In some implementations, the camera bracket is configured to retain the camera in a portrait orientation and to retain the flash oriented with the light-emitting element of the flash positioned above and proximate to the lens of the camera, when the telescoping stand is in an upright position. In some implementations, the outer shell is shaped to conform with an outline of the camera in the portrait orientation with the flash positioned above the camera lens. In some implementations, the electronic touch pad comprises a fingerprint reader.

The details of one or more implementations of the subject matter of this disclosure are set forth in the accompanying drawings and the description below. Other features, aspects, and advantages of the subject matter will become apparent from the description, the drawings, and the claims.

DESCRIPTION OF DRAWINGS

FIG. 3 depicts the system with camera housing removed for purposes of illustration.

Like reference numbers and designations in the various drawings indicate like elements.

DETAILED DESCRIPTION

In general, this disclosure describes a portable biometric capture system. More specifically, this disclosure relates to a portable system that can be used to capture biometric data of individuals applying for identification documents. For example, implementations disclosed herein provide a portable lightweight case that integrates various types of biometric capture equipment into the internal structure of the case. Implementations include, for example, a suitcase-sized carrying case that includes a camera stand integrated into the interior of the case with a camera housing mounted to the top of the stand. The camera stand can be implemented as a dual articulated telescoping stand. In such implementations, the camera stand is mounted to an interior of the case such that the case itself serves as a stable base for the stand when the system is in use. Moreover, the camera stand can be conveniently folded into the interior of the case for storage and travel. In some implementations, the case includes a power source (e.g., a battery or battery pack) fixed to the interior of the case and power wiring routed through the stand and into the camera housing to provide power to a camera and flash enclosed therein. Some implementations include additional biometric capture devices integrated into the case such as an electronic fingerprint reader and/or a signature pad.

Figure 1:
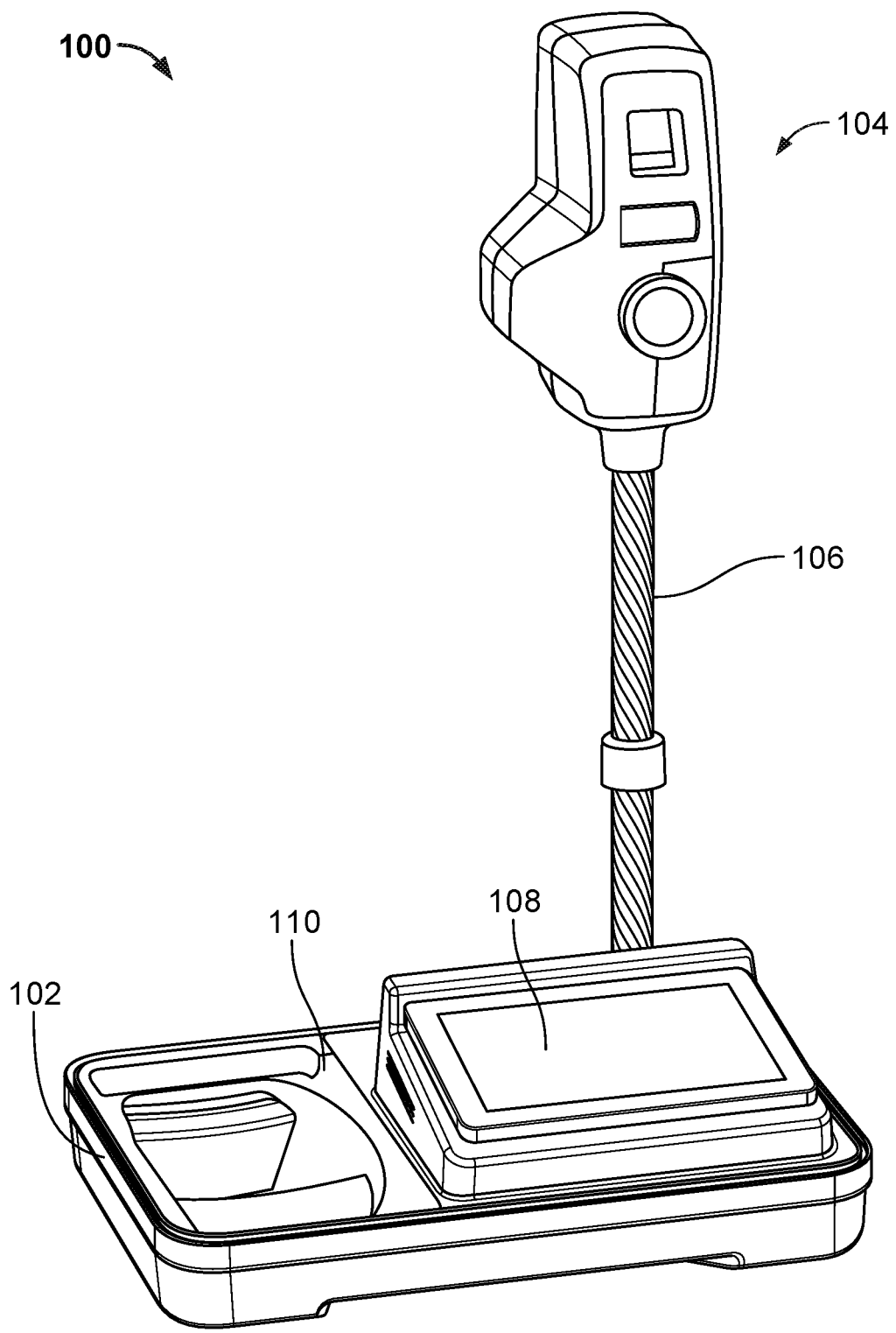
FIG. 1 depicts an example portable biometric capture system in an open/operational configuration.

FIG. 1 depicts an example portable biometric capture system 100 in an open configuration. The system 100 includes a case 102 (bottom half shown) with an integrated camera housing 104 and stand 106. In the open configuration stand 106 is configured to extend out of the interior of the case 102 using the case 102 itself as a base for the stand. As illustrated, the system 100 includes an electronic touch pad 108 that can be implemented as a fingerprint reader or electronic signature pad or a combination thereof. For example, the touch pad 108 can be a touchpad or a touch-screen display.

Figure 2:
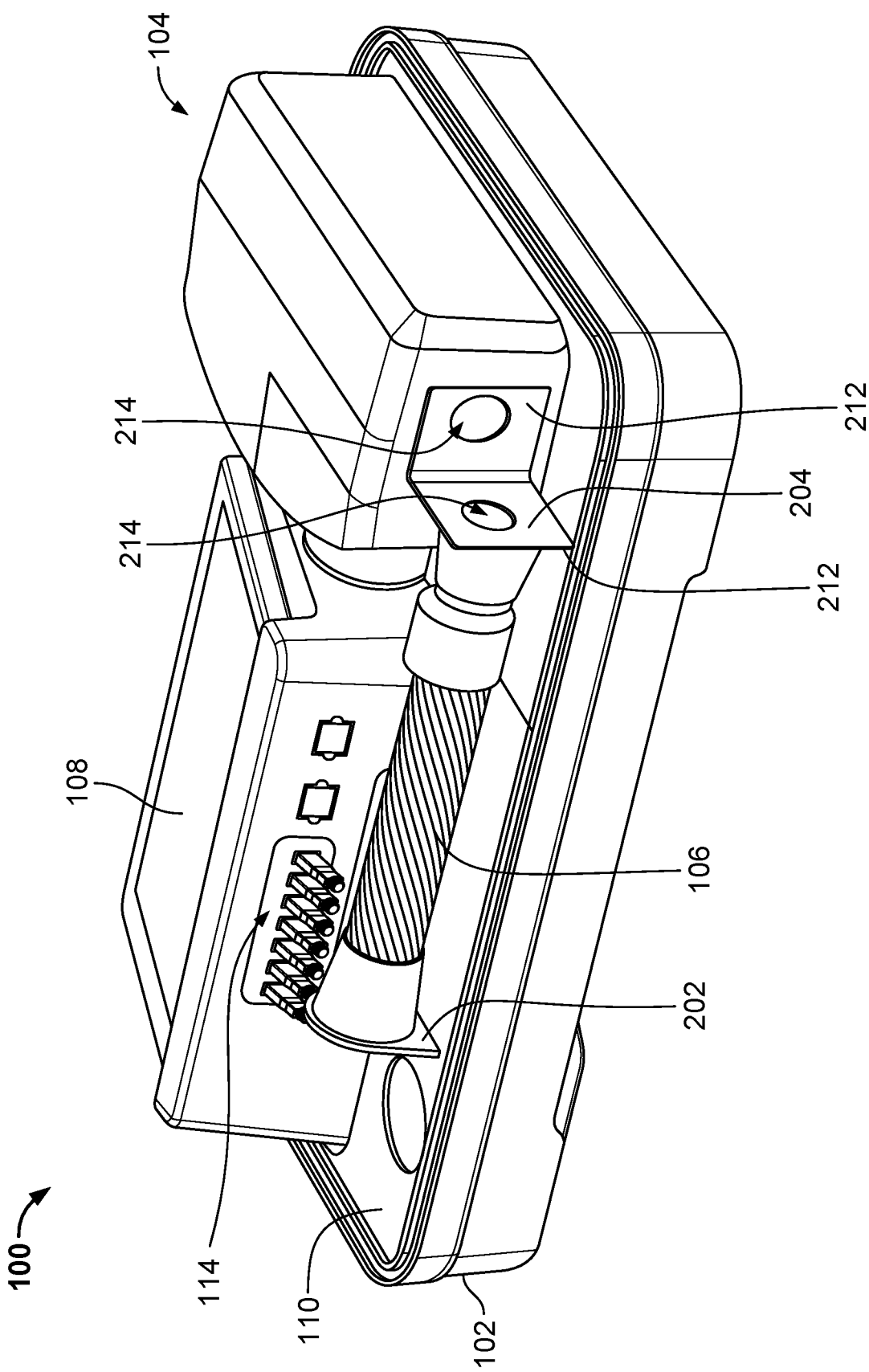
FIGS. 2 and 3 depict the portable biometric captures system of FIG. 1 in a collapsed/transport configuration.
Figure 3:
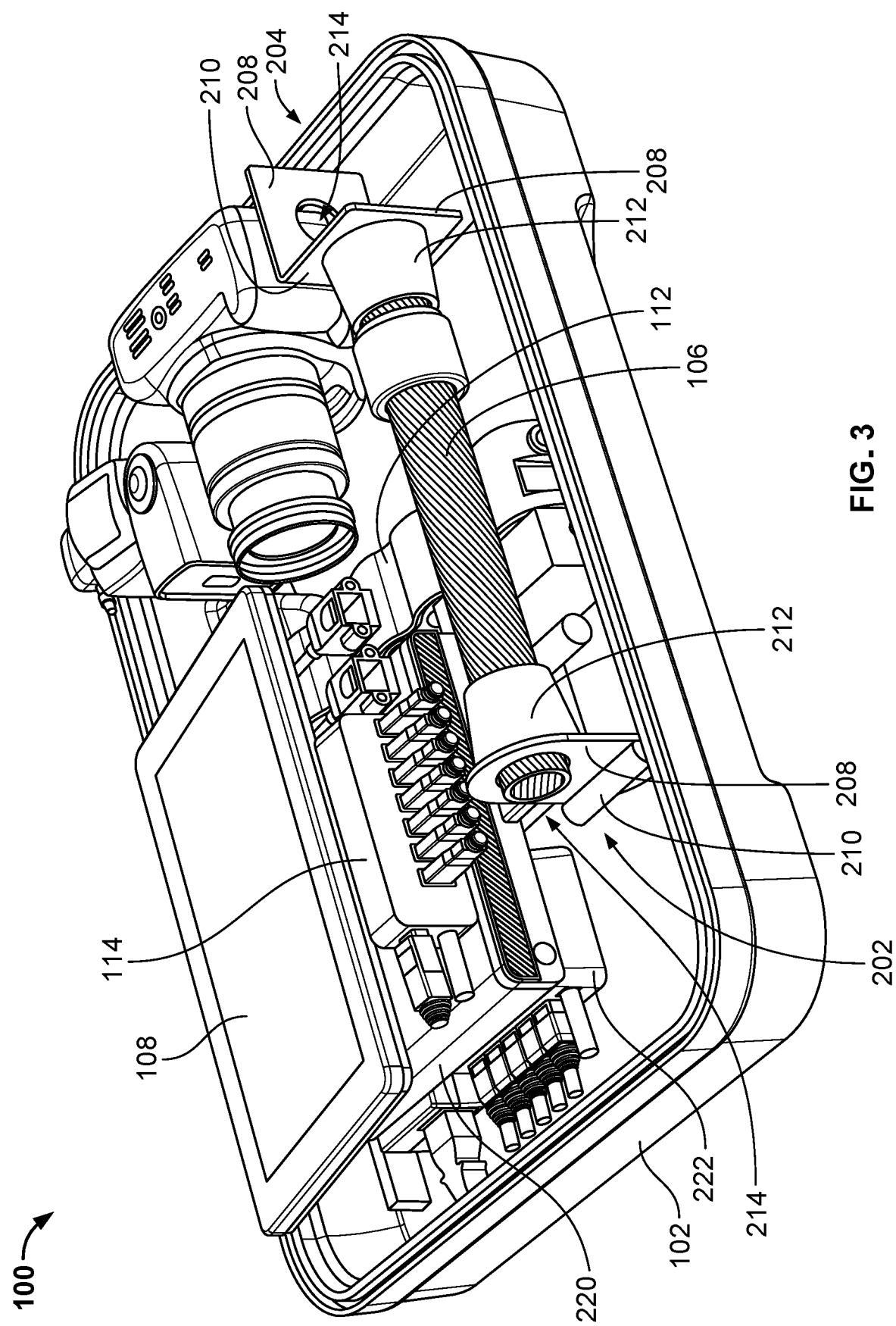

FIGS. 2 and 3 depict the portable biometric captures system 100 of FIG. 1 in a collapsed/transport configuration; FIG. 3 depicts the system 100 with the outer shell of the camera housing 104 removed for purposes of illustration. Referring to FIGS. 1-3, the stand 106 and camera housing 104 are configured to be collapsed and folded neatly into the interior of the case 102 for storage and transportation. For example, the stand 106 can be a dual articulated stand. More specifically, the stand can be configured to articulate it into different directions, e.g., at an upper and lower joints, so that when folded the stand 106 lies flat along a length of the case 102 and the camera housing 104 can be pivoted while still attached to the stand to lie flat along a width the case when 102.

Stand 106 is mounted to the interior of the case 102 by at a lower joint 202 and coupled to the camera housing 104 at an upper joint 204. Both joints 202 and 204 are pivotable joints. For example, joints 202 and 204 can be implemented as hinges. In the implementation depicted, joints 202 and 204 are constructed of two plates 208 coupled together by a hinge 210. One plate 208 of joint 202 is mounted to the interior of the case 102 and the second plate 208 of joint 202 is coupled to the stand 106 by a hollow shroud 212 that extends partially along the lower end of the stand 106. For joint 204, one plate 208 of joint 204 is coupled to camera housing 104 and the second plate 208 of joint 204 is coupled to the stand 106 by a hollow shroud 212 that extends partially along the upper end of the stand 106. Joints 202 and 204 can be coupled to the lower/upper ends of the stand 106 by a friction fit between the shroud 212.

Joint 202 is positioned within the case 102 in a manner that permits the stand 106 to be pivoted into the interior case along the length of the case 102 (with the case laid flat). More specifically, joint 202 is positioned within the case to allow the stand 106 to lay flat along the longest dimension of the case 102. For example, joint 202 is positioned within the case 102 so the axis about which joint 202 pivots is substantially perpendicular to the length of the case. More particularly, in the illustrated implementation, joint 202 is positioned within the case 102 so that the axis about which joint 202 pivots is substantially parallel to the width of the case 102.

Joint 204 is at the upper end of the stand 106 in a manner that permits the camera housing 104 to be pivoted into the interior case along the width of the case 102 (with the case laid flat). For example, joint 202 is positioned within the case 102 so the axis about which joint 204 pivots is substantially perpendicular to the width of the case (when in the storage position). More particularly, in the illustrated implementation, joint 204 is positioned so that the axis about which joint 204 pivots is substantially parallel to the height (or depth) of the case 102.

In some implementations, the stand 106 can be coupled to the shrouds 212 by a mechanical fastener (e.g., a screw or a rivet). In some implementations, the joints 202, 204 have an aperture 214 formed in the plates 208. The apertures 214 are arranged to generally align with a channel extending through the length of the stand 106 when the stand 102 is extended in the upright (operational) position (depicted in FIG. 1) to permit power and data wiring (e.g., a USB cable) to be routed through the stand and up to the camera housing 104.

The stand 106 is manufactured from a lightweight and sturdy material. For example, stand 106 can be formed from one or more materials including, but not limited to, metal or metal alloys, aluminum, carbon fiber, fiberglass, steel, plastic, or other composite materials.

In some implementations, the system 100 can include a power source 112 installed within the interior of the case 102. For example, the power source 112 can be a battery or battery pack and associated power management circuitry. In some implementations, the power source 112 can include a connection and/or a cable for connecting to an external power supply.

In some implementations, the system 100 can include a data communication interface 114 installed within the interior of the case 102. For example, the system 100 can include a wired and/or wireless data communication interface 114. For example, the data communication interface can be a USB hub or a wireless networking interface (e.g., a Wi-Fi or Bluetooth interface). The data communication interface 114 may permit a user to connect the system 100 with an external computing system (e.g., a laptop or tablet computer) to, for example, control operations of and/or receive biometric data from the camera 116, the touch pad 108, or other biometric capture devices.

In some implementations, the system 100 includes an computing device integrated into the case 102. For instance, in the example depicted in FIGS. 2 and 3 a mini-computer 220 is integrated into the bottom portion of the case underneath the decking 110. The mini-computer can be, for example, a mini desktop PC. In some implementations, the a data communication interface 114 serves as a peripheral connection hub for connecting the camera and the touchpad 108 to the mini-computer 220.

In some implementations, the system 100 includes a router 222 integrated into the case 102. For instance, in the example depicted in FIGS. 2 and 3 a mini-computer 220 is integrated into the bottom portion of the case underneath the decking 110. The router 222 can be a wired or wireless router (e.g., an Ethernet or WiFi router). The router 222 can be combined router and modem. In some implementations, the system 222 can include a separate modem coupled to the router 222. For example, the router 222 can include or be coupled to a cable modem, a DSL modem, or a cellular modem (e.g., a 4G, LTE, or 5G capable cellular router/modem).

The system 100 includes power and data wiring installed within the case 102 in order to electrically connect components such as a camera and flash installed within the camera housing 104 and the touchpad 108 with the power source 112 and the data communication interface 114. In some examples, the data and power wiring can be included in one cable, e.g., using a USB cable or other similar type of cable. In some implementations, power and data wiring is routed from the inside of the case 102 (e.g., from the power source 112 and/or the data communication interface 114) to the camera housing 104 (e.g., for connection to a camera/flash installed therein) through a channel within the stand 106. For instance, a power cable and a data cable (e.g., a USB cable) can be routed through the aperture 214 of joint 202, through a channel passing through a hollow stand 106, through the apertures 214 of joint 204, and into the camera housing 104.

Additionally, the case 102 can include decking 110 to, for example, conceal some of the internal components and associated wiring. FIGS. 1 and 2 illustrate the case 102 with decking 110 installed and FIG. 3 illustrates the case 102 with the decking 110 removed for illustration purposes.

Figure 4:
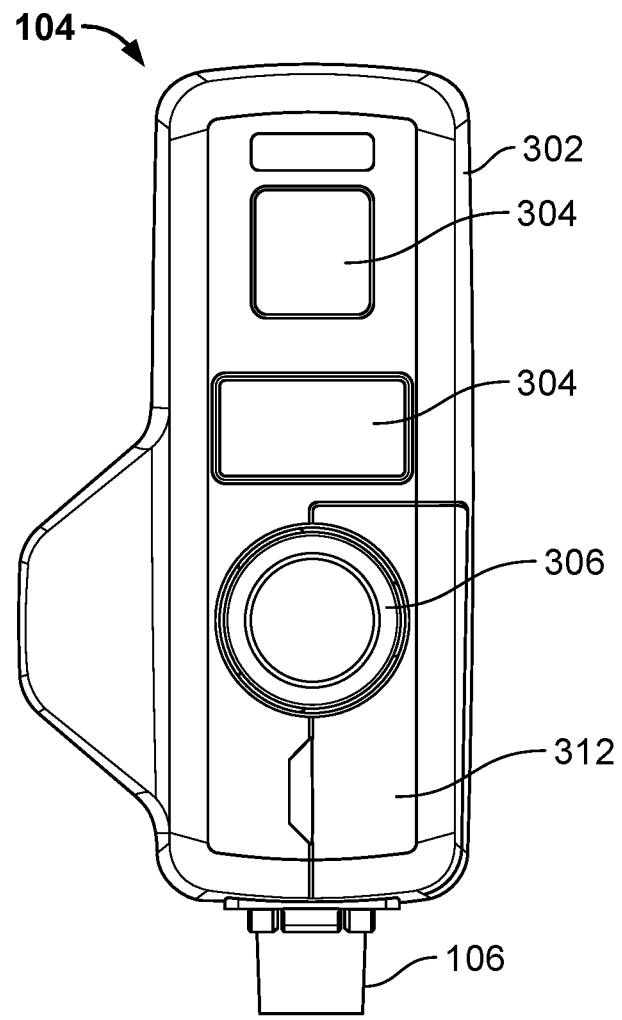
FIG. 4 is a front view of the camera housing in more detail.
Figure 5A:
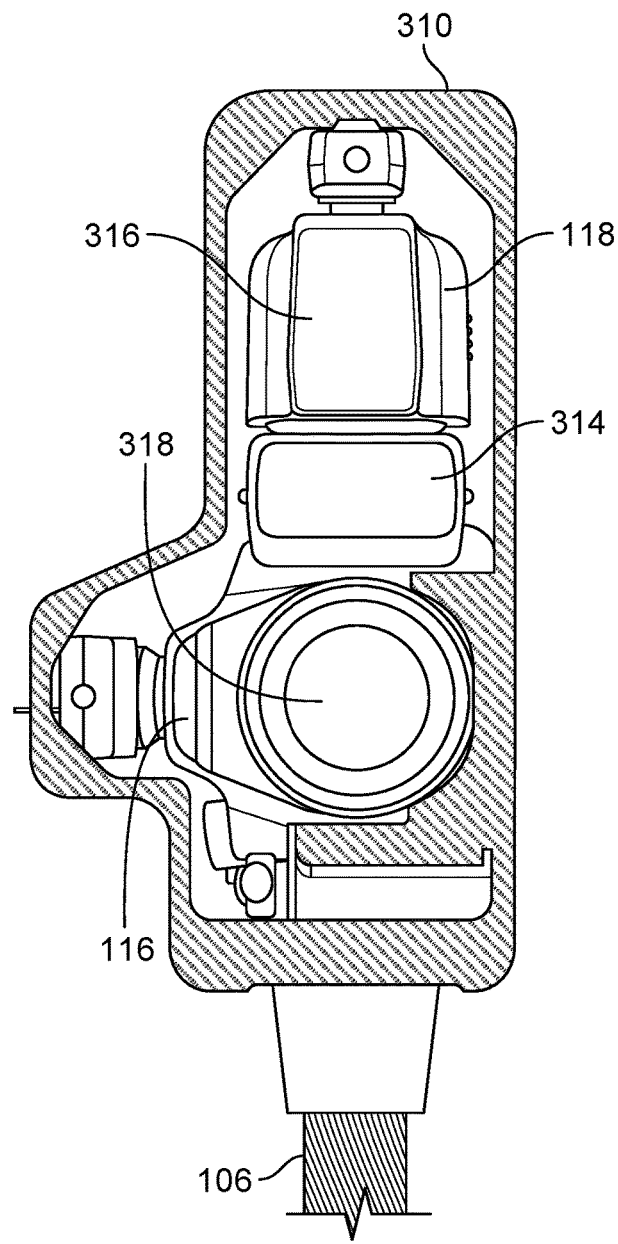
FIGS. 5A and 5B are front and side views of a camera bracket located inside the camera housing.
Figure 5B:
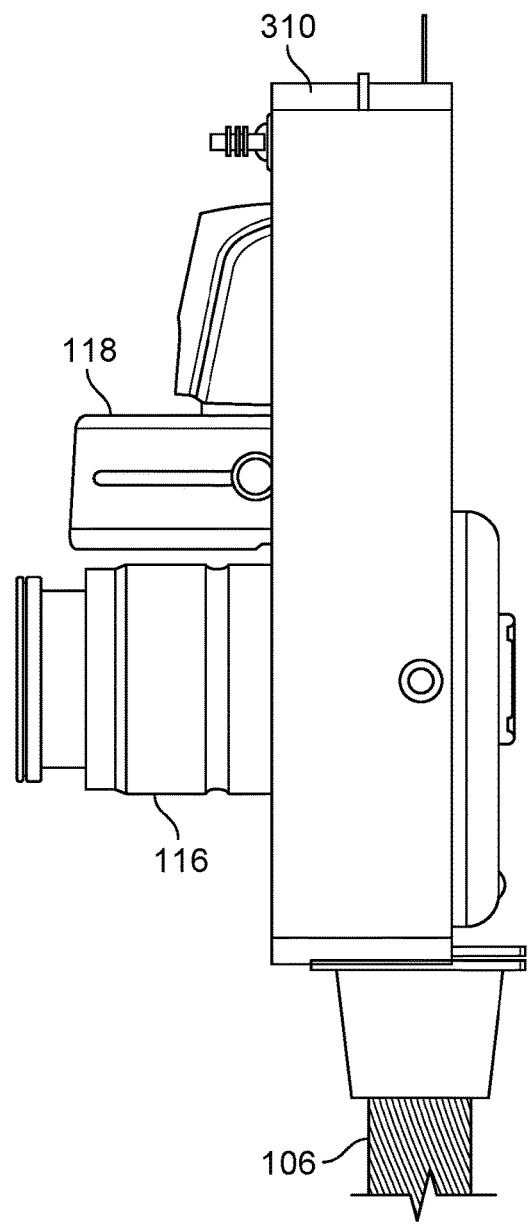

FIG. 4 is a front view of the camera housing 104. FIGS. 5A and 5B are front and side views of a camera bracket 310 located inside the camera housing 104. Referring to FIGS. 4, 5A, and 5B; the camera housing 104 can include an outer shell 302 and internal support bracket 310. For example, bracket 310 is configured to securely support a camera 116 and flash 118 within the camera housing 104. In the example illustrated, bracket 310 is shaped to receive and retain a camera 116 oriented in a portrait photographic orientation with an external flash 118 positioned proximate to and above the camera's lens 318. More specifically, bracket 310 is shaped to retain the flash 118 and orientation that places the light-emitting elements 314 of the flash slightly above the camera's lens 318 with a light sensor 316 of the camera 116 positioned above the light-emitting element 314. For example, the perimeter of bracket 310 is shaped to substantially conform with an outline of the camera 116 when positioned in a portrait orientation with the flash 118 positioned above the lens 318. Bracket 310 includes mounting hardware to retain the camera 116 and lens 118 in position within the bracket 310.

Bracket 310 can be configured to receive and retain various types of cameras. For example, as illustrated bracket 310 is configured to retain a digital single lens reflex (DSLR) camera. In other implementations, bracket 310 can be configured to retain different types of cameras such as a compact camera or a mirrorless camera.

The outer shell 302 is configured to enclose the camera 116 and flash 118 when mounted in bracket 310. Shell 302 includes an opening 306 positioned to align with the camera lens 318 when the camera is mounted. Shell 302 includes windows 304. One window 304 is positioned to align with the light-emitting elements 314 of the flash 118 when the flash is mounted within bracket 310. 304 is positioned to align with the light sensor 316 of the flash 118 when the flash is mounted within bracket 310. In the example illustrated, the outer shell 302 is shaped to substantially conform with the outline of the camera 116, flash 118, and bracket 310.

In some implementations, the shell 302 includes an access door 312. For example, access door 312 can be configured to swing open providing a user with access to the camera lens 318. For instance, the door 312 may allow a user to access the lens to manually focus the camera or swap lenses without having to remove the entire outer shell 302.

The bracket 310 can be manufactured from a sturdy lightweight material. For example, the bracket 310 can be formed from one or more materials including, but not limited to, metal or metal alloys, aluminum, carbon fiber, fiberglass, steel, plastic, or other composite materials. The shell 302 can be manufactured from a lightweight material. For example, the shell 302 can be formed from one or more materials including, but not limited to, metal or metal alloys, aluminum, carbon fiber, fiberglass, steel, plastic, or other composite materials.

Figure 6:
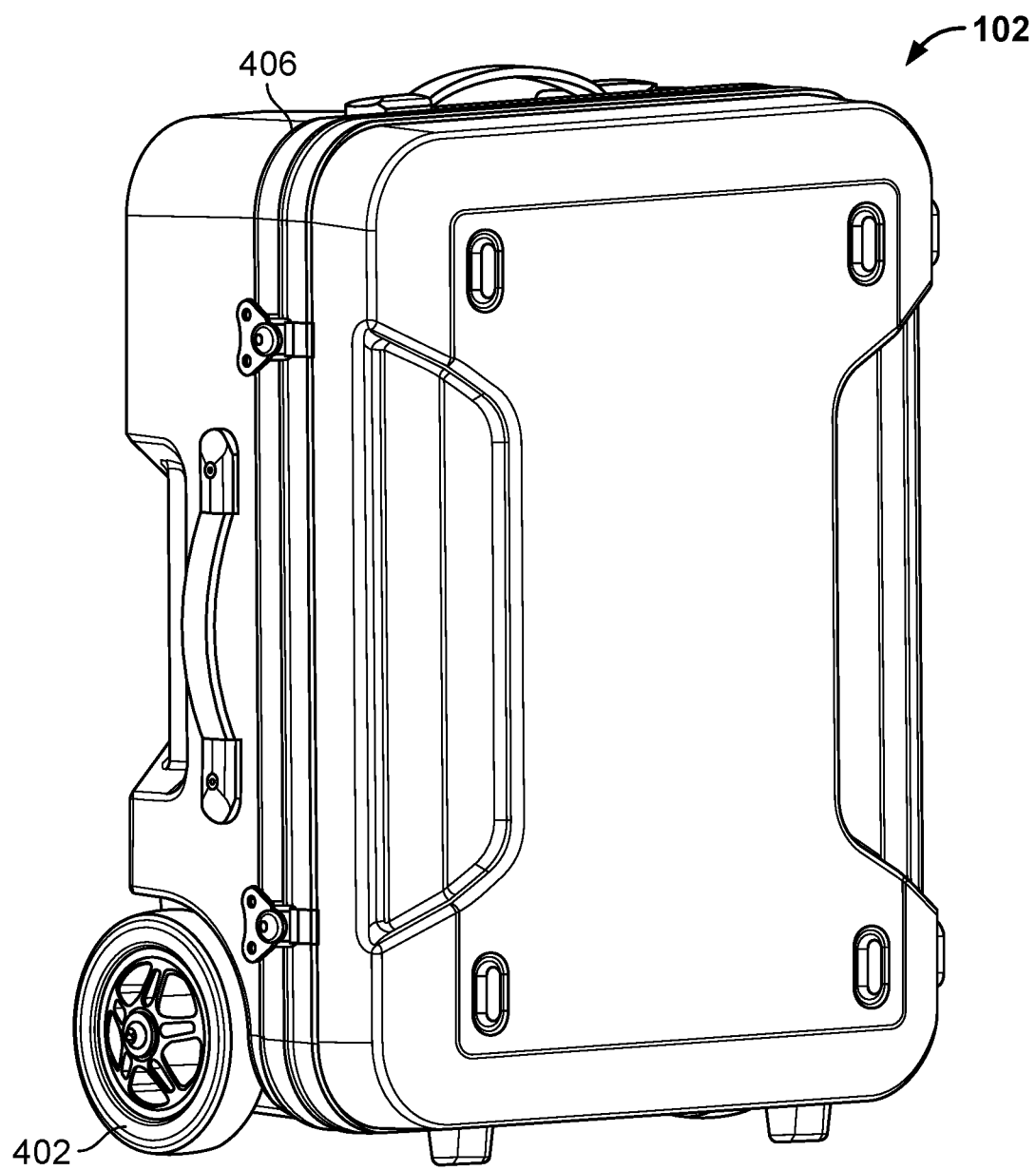
FIG. 6 is a front-perspective view of a case of the portable biometric capture system.
Figure 7:
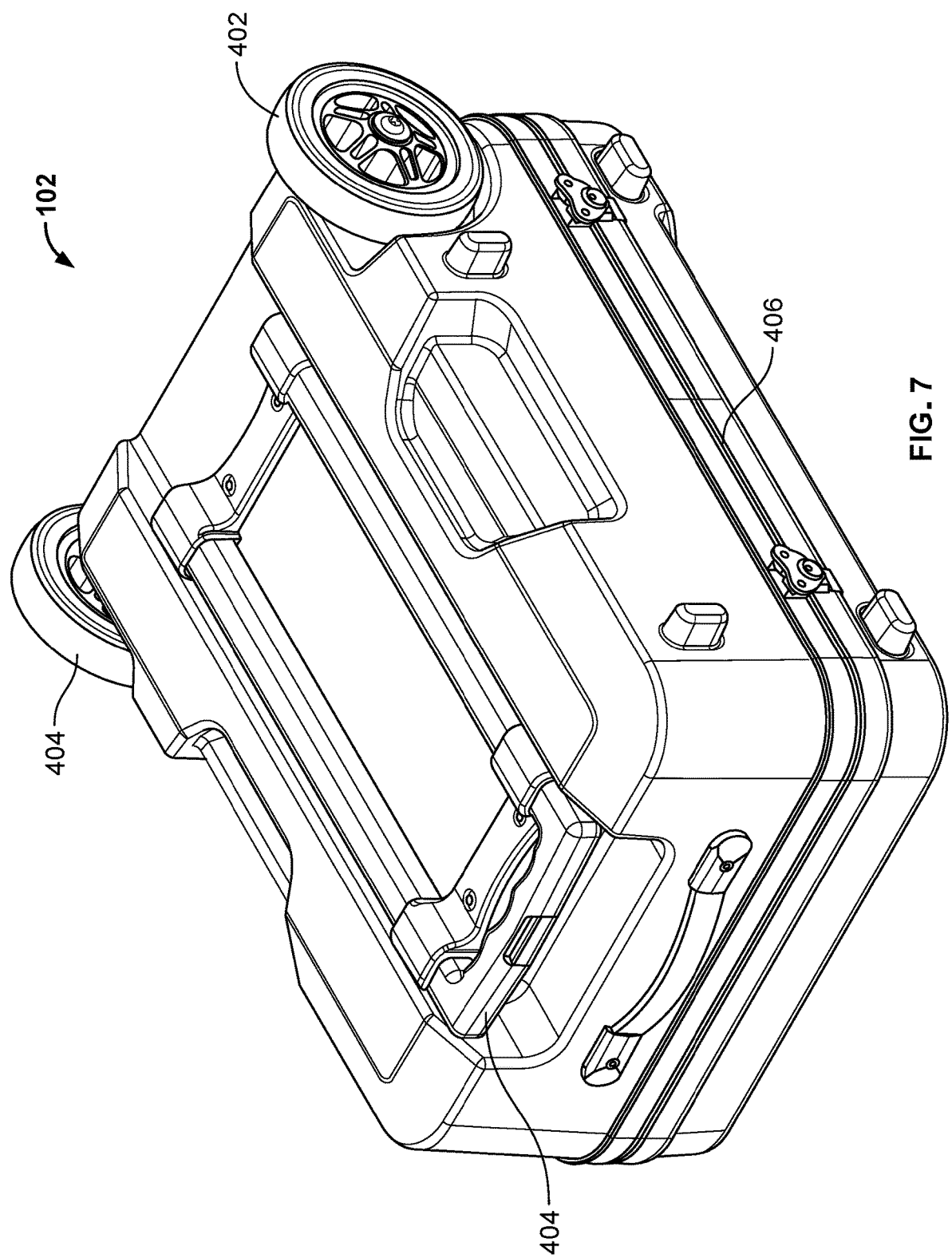
FIG. 7 is a back-perspective view of a case of the portable biometric capture system.

FIG. 6 is a front-perspective view of a case 102 of the portable biometric capture system. FIG. 7 is a back-perspective view of a case 102 of the portable biometric capture system. Case 102 can be constructed of lightweight materials. For example, the case 102 can be formed from one or more materials including, but not limited to, metal or metal alloys, aluminum, carbon fiber, fiberglass, steel, plastic, or other composite materials. In the illustrated implementation, case 102 includes wheels 402 mounted to the bottom. The wheels 402 can be oversized wheels to make the case easier to transport. For example, the wheels 402 have a diameter that ranges between 1"-10" in various implementations. Case 102 can also include an extendable handle 404. For example, handle 404 can be mounted to the backside of the case 102. In some implementations, case 102 can include a seal 406 along the edges of the case opening. For example, seal 406 can be applied along the edges of the upper and lower half of the case 102.

The elements and assemblies discussed herein may be constructed from any of a wide variety of materials that provide sufficient strength or durability, in any of a wide variety of colors, textures, and combinations. Further, elements shown as integrally formed may be constructed of multiple parts or elements.

As used herein, the terms "generally," "substantially," and similar terms are intended to have a meaning consistent with the common and accepted usage by those of ordinary skill in the art to which the subject matter of this disclosure pertains. For example, the use of such terms indicate that associated values, measurements, or spatial relationships described herein may vary within acceptable engineering, machining, or measurement tolerances within the art. Accordingly, these terms should be interpreted as indicating that insubstantial or inconsequential modifications or alterations of the subject matter described and claimed are considered to be within the scope of the invention as recited in the claims.

It should be noted that the orientation of various elements may differ according to other exemplary implementations, and that such variations are intended to be encompassed by the present disclosure.

While a number of examples have been described for illustration purposes, the foregoing description is not intended to limit the scope of the invention, which is defined by the scope of the appended claims.

What is claimed is:

1. A portable system for capturing biometric data of individuals applying for identification documents, the system comprising:
   a case comprising wheels and a carry handle;
   a telescoping stand comprising a first end and a second end, the telescoping stand coupled, at the first end, to a surface within an interior of the case by a first pivotable joint;
   a camera housing coupled to the telescoping stand, at the second end, by a second pivotable joint, the camera housing configured to retain a camera and a flash with the camera oriented in a portrait orientation and with a light-emitting element of the flash positioned above and proximate to a lens of the camera, when the telescoping stand is in an upright position, and wherein the camera housing comprises:
      a first window positioned to substantially align with the light-emitting element of the flash, and
      a second window positioned to substantially align with a light sensor of the flash; and
   a power source installed within the interior of the case and electrically connected to a wiring that is routed to the camera housing through a channel within the telescoping stand.

2. The system of claim 1, wherein the first pivotable joint is a first hinge joint arranged to permit the telescoping stand to pivot in a first direction relative to case, and
   wherein the second joint is a hinge joint arranged to permit the camera housing to pivot in a second direction relative to the case, the second direction being different from the first direction.

3. The system of claim 1, wherein the first pivotable joint is arranged to pivot about a first axis that is substantially parallel to a width of the case, and wherein the second pivotable joint is arranged to pivot about a second axis that is substantially parallel to a depth of the case.

4. The system of claim 1, wherein the case is made of plastic.

5. The system of claim 1, further comprising an electronic touch pad installed within the interior of the case.

6. The system of claim 1, further comprising a fingerprint reader installed within the interior of the case.

7. The system of claim 1, further comprising a data communication interface installed within the interior of the case, wherein the data communication interface is electrically connected to the wiring.

8. The system of claim 7, wherein the data communication interface comprises a Universal Serial Bus (USB) hub.

9. The system of claim 7, wherein the data communication interface comprises a wireless network interface.

10. A portable biometric capture system comprising:
    a case comprising wheels and a carry handle;
    a telescoping stand comprising a first end and a second end, the telescoping stand coupled, at the first end, to a surface within an interior of the case by a first pivotable joint;
    a camera housing coupled to the telescoping stand, at the second end, by a second pivotable joint, the camera housing comprising:
       a bracket configured to receive a camera and a flash; and
       an outer shell configured to enclose the camera and the flash, with the camera mounted in the bracket, the outer shell having an opening positioned to align with a lens of the camera, with the camera mounted in the bracket, wherein the outer shell comprises:
          a first window positioned to align with a light-emitting element of the flash, with the flash mounted in the bracket, and
          a second window positioned to align with a light meter of the flash, with the flash mounted in the bracket;
    an electronic touch pad installed within the interior of the case;
    a power source installed within the interior of the case and electrically connected to the electronic touch pad and to a wiring routed to the camera housing through a channel within the telescoping stand; and
    a data communication interface installed within the interior of the case, wherein the data communication interface is electrically connected to the electronic touch pad and the wiring.

11. The system of claim 10, wherein the case is made of plastic.

12. The system of claim 10, wherein the telescoping stand is made of plastic.

13. The system of claim 10, wherein an outer shell of the camera housing is made of plastic.

14. The system of claim 10, wherein the data communication interface comprises a Universal Serial Bus (USB) hub.

15. The system of claim 10, wherein the data communication interface comprises a wireless network interface.

16. The system of claim 1, wherein the camera housing comprises an access door.

17. A portable biometric capture system comprising:
a case comprising wheels and a carry handle;
a telescoping stand comprising a first end and a second end, the telescoping stand coupled, at the first end, to a surface within an interior of the case by a first pivotable joint;
a camera housing coupled to the telescoping stand, at the second end, by a second pivotable joint, the camera housing comprising:
- a bracket;
- a camera mounted in the bracket;
- a flash mounted in the bracket and adjacent to the camera; and
- an outer shell configured to enclose the camera and the flash, the outer shell having an opening positioned to align with a lens of the camera, with the camera mounted in the bracket, wherein the outer shell comprises:
  - a first window positioned to align with a light-emitting element of the flash, and
  - a second window positioned to align with a light meter of the flash;

an electronic touch pad installed within the interior of the case;
a power source installed within the interior of the case and electrically connected to the electronic touch pad and to a wiring routed to the camera housing through a channel within the telescoping stand; and
a data communication interface installed within the interior of the case, wherein the data communication interface is electrically connected to the electronic touch pad and the wiring.

18. The system of claim 17, wherein the camera is a digital single-lens camera (DSLR),
wherein the camera bracket is configured to retain the camera in a portrait orientation and to retain the flash oriented with the light-emitting element of the flash positioned above and proximate to the lens of the camera, when the telescoping stand is in an upright position,
wherein the outer shell is shaped to conform with an outline of the camera in the portrait orientation with the flash positioned above the camera lens, and
wherein the electronic touch pad comprises a fingerprint reader.

19. The system of claim 1, wherein the camera housing comprises an access door.

20. The system of claim 1, wherein the camera is a digital camera configured to store at least one image of an individual applying for an identification document.

\* \* \* \* \*